United States Patent
Delaney et al.

(10) Patent No.: US 11,212,578 B2
(45) Date of Patent: Dec. 28, 2021

(54) VISIBLE INDICATOR FOR IMPORTANCE OF AUDIO

(71) Applicant: Lenovo (Singapore) Pte. Ltd., Singapore (SG)

(72) Inventors: Mark Patrick Delaney, Raleigh, NC (US); Nathan J. Peterson, Oxford, NC (US); Russell Speight VanBlon, Raleigh, NC (US); Arnold S. Weksler, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/790,720

(22) Filed: Feb. 13, 2020

(65) Prior Publication Data
US 2021/0258638 A1    Aug. 19, 2021

(51) Int. Cl.
*H04N 21/44*    (2011.01)
*H04N 21/234*    (2011.01)
*G06F 40/169*    (2020.01)
*H04N 21/431*    (2011.01)
*G06N 3/04*    (2006.01)

(52) U.S. Cl.
CPC ..... *H04N 21/44008* (2013.01); *G06F 40/169* (2020.01); *G06N 3/0445* (2013.01); *G06N 3/0472* (2013.01); *H04N 21/23424* (2013.01); *H04N 21/431* (2013.01)

(58) Field of Classification Search
CPC ........ H04N 21/23424; H04N 21/44008; G06F 40/169; G06N 3/0445; G06N 3/0472
USPC .......................................................... 725/32
See application file for complete search history.

(56) References Cited

U.S. PATENT DOCUMENTS

| | | | |
|---|---|---|---|
| 7,769,626 B2* | 8/2010 | Reynolds | G06Q 30/0203 705/7.32 |
| 2016/0379123 A1* | 12/2016 | Younessian | G06Q 30/0201 706/52 |
| 2016/0381399 A1* | 12/2016 | Brondijk | H04N 21/4856 725/116 |
| 2018/0137932 A1* | 5/2018 | Fiedler | G16H 40/20 |
| 2020/0035259 A1* | 1/2020 | Thuillier | H04S 7/302 |
| 2020/0105274 A1* | 4/2020 | Joller | G10L 25/81 |
| 2020/0126583 A1* | 4/2020 | Pokharel | G10L 15/1822 |
| 2020/0159838 A1* | 5/2020 | Kikin-Gil | G06F 3/167 |
| 2020/0358628 A1* | 11/2020 | Achyuth | G10L 17/00 |
| 2021/0074305 A1* | 3/2021 | Gopala | G10L 19/0212 |

FOREIGN PATENT DOCUMENTS

JP    7296904 A    * 11/1995

* cited by examiner

*Primary Examiner* — Dominic D Saltarelli
(74) *Attorney, Agent, or Firm* — John M. Rogitz; John L. Rogitz (57) ABSTRACT

In one aspect, a device includes a processor, a video display accessible to the processor, and storage accessible to the processor and comprising instructions executable by the processor to present an indication on the video display of an importance of audio to video relative to effective user consumption.

20 Claims, 6 Drawing Sheets

VISIBLE INDICATOR FOR IMPORTANCE OF AUDIO

FIELD

The present application relates to technically inventive, non-routine solutions that are necessarily rooted in computer technology and that produce concrete technical improvements.

BACKGROUND

As recognized herein, videos are commonly shared among users and user groups via social media. Present principles understand that for some video media, the audio component is critical for consumption, whereas in other cases the audio is not necessary, and the media can be consumed satisfactorily without sound. Two examples of such video include public settings and ephemeral content. However, as understood herein with respect to ephemeral content in particular, video once consumed is no longer available, including any accompanying audio.

There are currently no adequate solutions to the foregoing computer-related, technological problem.

SUMMARY

Accordingly, in one aspect a device includes at least one processor, a video display accessible to the at least one processor, and storage accessible to the at least one processor that includes instructions executable by the at least one processor to present a visible indication on the video display of an importance of audio to video presented on the video display.

In example embodiments, the instructions are executable to present on the video display a first visible indication for a first video indicating audio is important to the first video, and present on the video display a second visible indication for a second video indicating audio is not important to the second video. The first visible indication can include a first color and the second visible indication can include a second color.

In some examples, the visible indication is not selectable to toggle audio on and off. In other examples, the visible indication is selectable to toggle audio on and off.

In example implementations the visible indication includes a halo around a symbol. In other example implementations the visible indication includes a halo around a scrolling video pane.

Visible indication may be associated with video responsive to classification input from a user input device. Or, visible indication may be associated with video responsive to classification input from at least one neural network.

In another aspect, at least one computer readable storage medium (CRSM) that is not a transitory signal includes instructions executable by at least one processor to identify a first audio video content as being in a first classification, and based at least in part on identifying the first audio video content as being in the first classification, juxtapose a first visible indicator with the first audio video content. The instructions also are executable to identify a second audio video content as being in a second classification, and based at least in part on identifying the second audio video content as being in the second classification, juxtapose a second visible indicator with the second audio video content. The first classification includes a first audio play recommendation and the second classification includes a second audio play recommendation.

In another aspect, a method includes presenting on a video display a first indicator indicating that a respective first video is recommended for play without audio accompanying the first video, and presenting on the video display a second indicator indicating that a respective second video is recommended for play with audio accompanying the second video.

The details of present principles, both as to their structure and operation, can best be understood in reference to the accompanying drawings, in which like reference numerals refer to like parts, and in which:

DETAILED DESCRIPTION

Note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
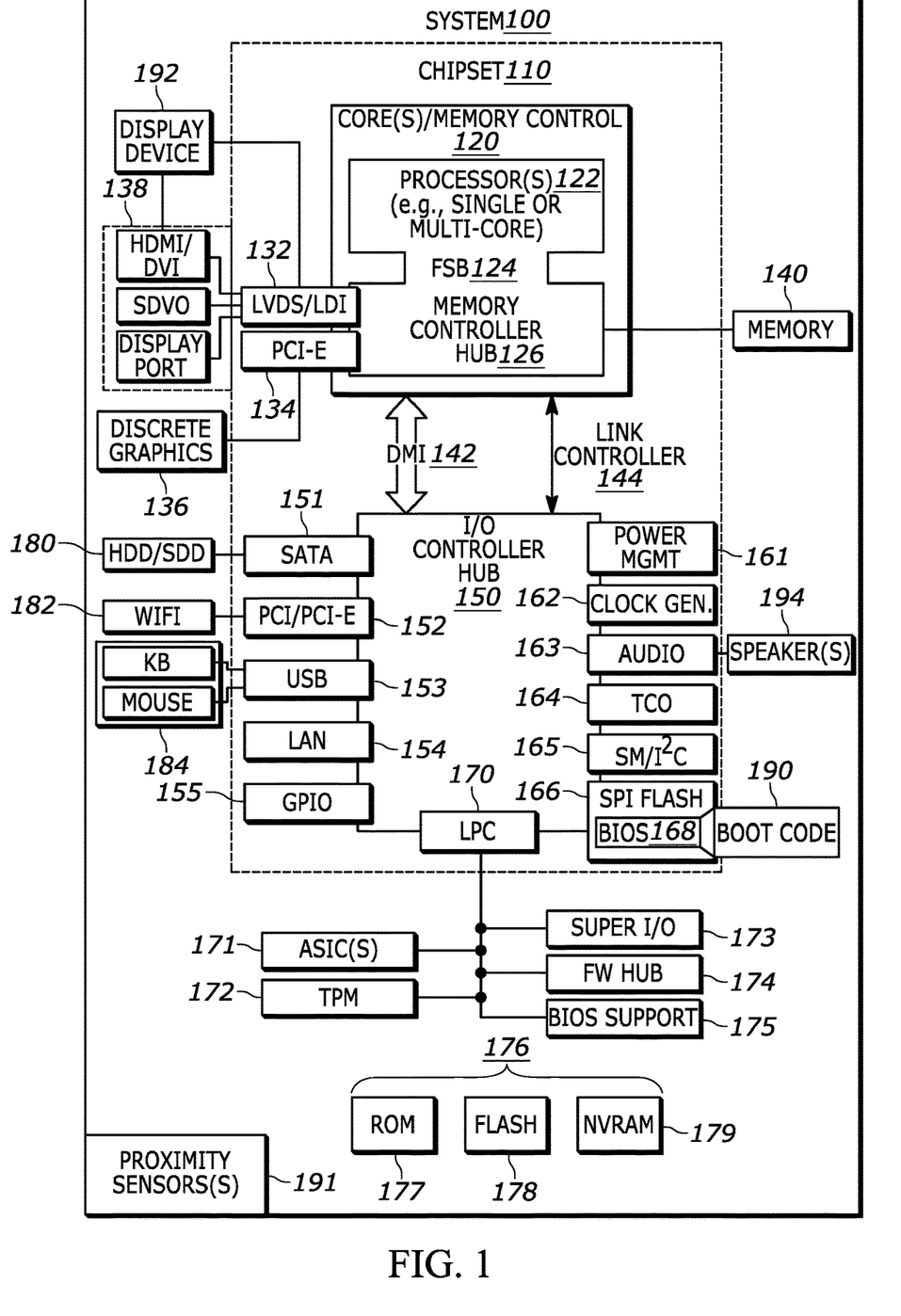
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
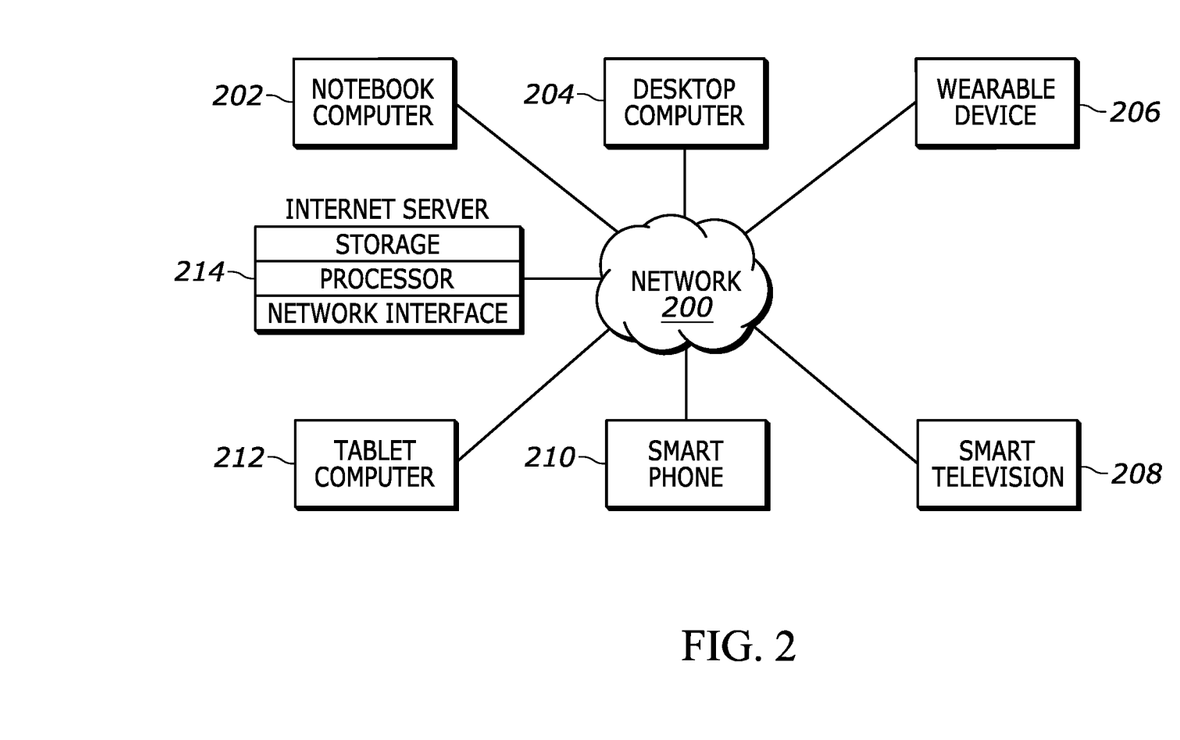
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
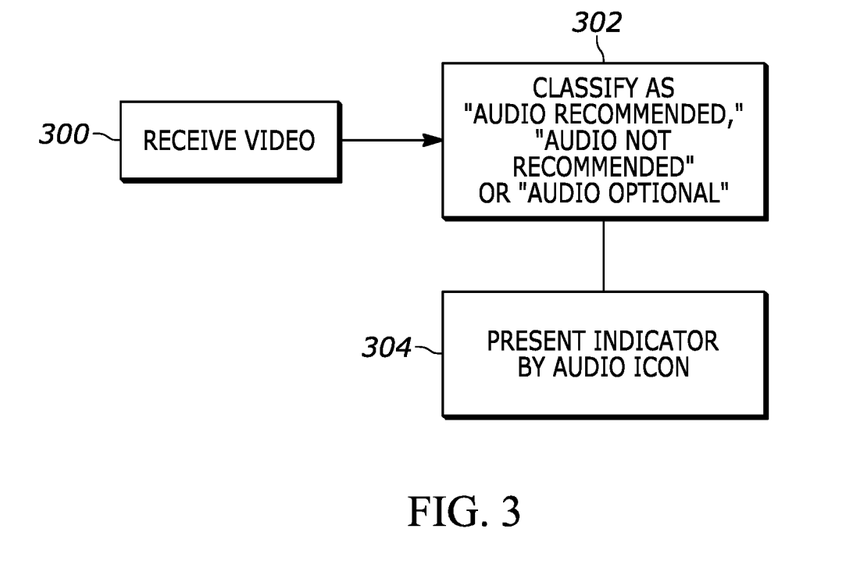
FIG. 3 is a flow chart of an example algorithm consistent with present principles.

Referring to FIG. 3, overall logic is shown that may be executed by a device such as any in the system 100 in accordance with present principles. Beginning at block 300, one or more videos and/or links to videos are received. Each video/link is identified at block 302 as belonging to one of at least two and in some embodiments three or more classifications pertaining to how necessary audio accompanying the video is to be able to enjoy or effectively "consume" the video. In an example, a first classification is that audio accompanying the video is recommended, i.e., should be played along with the video for effective consumption of the video, while a second classification is that audio accompanying the video need not be played for effective consumption of the video. A third classification may be that it is uncertain whether audio accompanying the video should be played for effective consumption of the video.

An example of a video in the first classification is a news feed, in which the principal import of the audio-video content is an audio report by a reporter in the video. An example of a video in the second classification is an extreme skiing video, in which the principal import of the audio-video content is the video action of the skier and not necessarily the audio, which typically is a background music track. An example of a video in the third classification may be a video that the logic cannot readily identify as being in the first or second classifications, or a video that may have been classified directly into the third classification by a user or a neural network as disclosed below.

In any case, proceeding from block 302 to block 304, a visible indicator associated with the classification at block 302 is presented adjacent or on the video.

Figure 4:
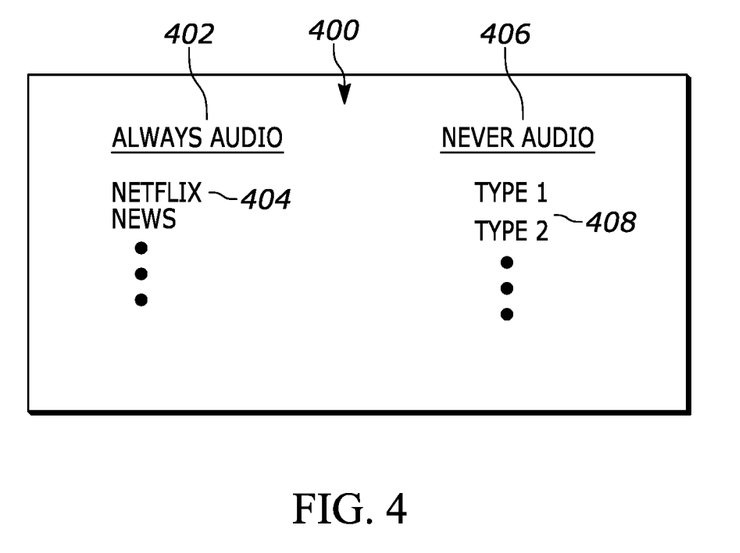
FIG. 4 is an example user interface (UI) consistent with present principles.
Figure 5:
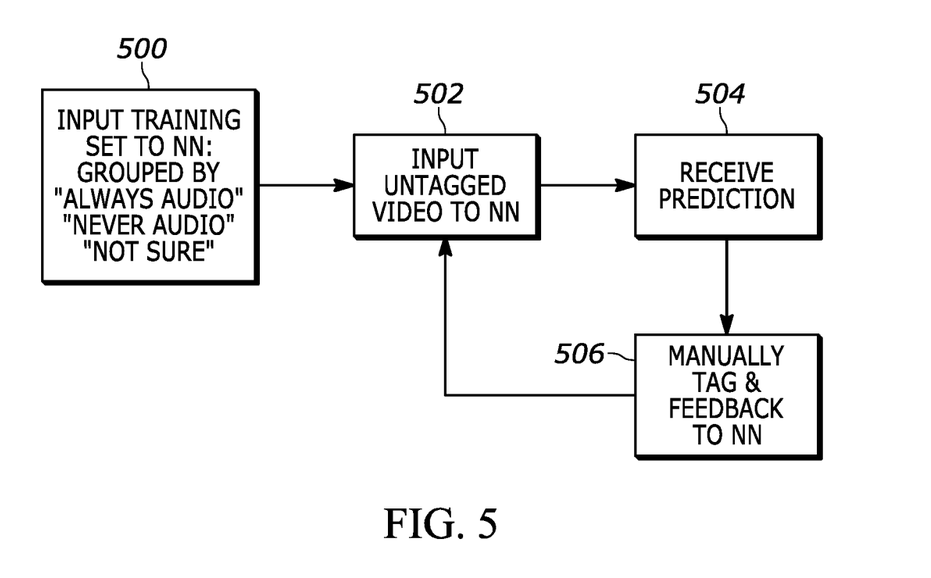
FIG. 5 is a flow chart of an example algorithm consistent with present principles.

FIGS. 4 and 5 illustrate two techniques for classifying videos. In FIG. 4 a UI 400 is presented on, e.g., a touch screen display allowing a user to correlate, via the touch screen display or other user input device, types of videos and/or individual videos with types of audio importance indicators. In the simplified example of FIG. 4, a first column 402 indicating that audio is always recommended for playing is shown, under which are entries 404 of types of videos the user wishes to be grouped in the "always audio" classification. The entries 404 may be manually entered by a user or may be presented automatically in a list from which the user can select videos and/or video types to associate with the "always audio" classification. These are but two example techniques for associating videos with audio recommendations. Similarly, a second column 406 indicating that audio is never recommended for playing is shown, under which are entries 408 of types of videos the user wishes to be grouped in the "never audio" classification. Additional columns for additional audio recommendation classifications may be included.

FIG. 5 shows an alternate technique that uses one or more neural networks (NN) to learn what types of videos should be associated with what kind of audio play recommendation. Commencing at block 500, a training set of videos is input into the NN pre-classified by a trainer into the desired audio recommendation classifications, e.g., "always audio", "never audio", and "unsure". Moving to block 502, an untagged video is input to the NN and at block 504 a prediction is received from the NN as to what audio recommendation classification the video is given. This prediction is manually tagged by a trainer at block 506 and fed back to the NN for further training.

In executing the logic of FIG. 5, image recognition (including whether setting is public, indicating no audio recommended or private indicating audio recommended), activity recognition (e.g., video motion vectors above a threshold indicate no audio needed), and audio recognition may be used to make a prediction as to whether audio accompanying video is recommended (or not) to be played to effectively consume the media. The audio analysis further may be based on how "full" the audio channel is, particularly the modulation of audio needed to separate noise from important sound relative to the media.

Figure 6:
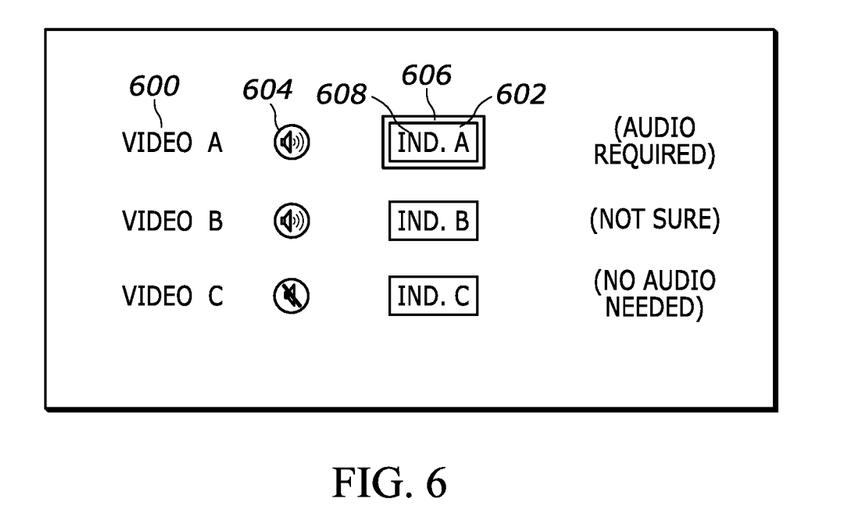
FIGS. 6-9 are further example UIs consistent with present principles.

Now referring to FIG. 6, a video display 600 is shown that may be implemented by any of the example displays described herein. As shown, a list of video selectors 600 may be presented with each selector 600 typically including a thumbnail still or video image of the underlying video that can be invoked by selecting, via touch or cursor input or other means, the desired selector 600. Adjacent each video selector 600 is a respective visible indication 602 indicating the importance of accompanying audio to effectively consuming the video associated with the respective selector 600.

Thus, a first visible indication can be presented for a first video indicating audio is important to the first video, while a second visible indication can be presented for a second video indicating audio is not important to the second video.

In some implementations the visible indication 602 is not selectable to toggle audio on and off. In such embodiments, a separate audio on/off toggle symbol 604 may be presented that can be selected to toggle audio on and off for the respective video. In other implementations the visible indication 602 is selectable to toggle audio on and off, in which case the audio on/off toggle symbols 604 can be omitted.

In the example shown, the visible indication includes a hollow "halo" 606 around a symbol 608 such as a square. In other examples the halo 606 may be omitted. In any case the halo 606 and/or symbol 608 have different visible appearances depending on whether audio is recommended for the associated video. For example, for a video identified as being in the "always audio" recommendation category (in the example shown, video A), the respective halo 606/symbol 608 may be a first color such as red, whereas for a video identified as being in the "never audio" recommendation category (in the example shown, video C), the respective halo 606/symbol 608 may be a second color such as green. For a video not identified as being in either the "always audio" or "never audio" recommendation category (in the example shown, video B), the respective halo 606/symbol 608 may be a third color such as yellow.

As examples, assume that the video selectors 600 in FIG. 6 are received from a social network that provides ephemeral videos. Absent present principles the user would not know which media is recommended as being acceptable to open without sound and still be able to be consumed and enjoyed. With the present visible indicators 602 the user is informed which media should be consumed with sound and which is OK to be consumed without sound.

In the case of video A in FIG. 6, assume the system has detected it as being a selfie video with the cameraman speaking into the camera. The system determines based on audio and visual analysis that sound is important to consume this media and consequently is associated with the "A" indicator in FIG. 6. Assume that the system detects video C as being a video of someone holding his phone out of the window of a car filming a landscape. The audio likely would be loud and indiscernible due to the wind noise, and the system therefore identifies that video C is OK to consume without audio and so the "C" visible indicator is presented adjacent video C. In contrast, assume that the system identifies video B as a video of someone doing a handstand with cheering in the background, identifying the video as one that may be enjoyed with audio or without audio and consequently presenting the "B" indicator.

Figure 7:
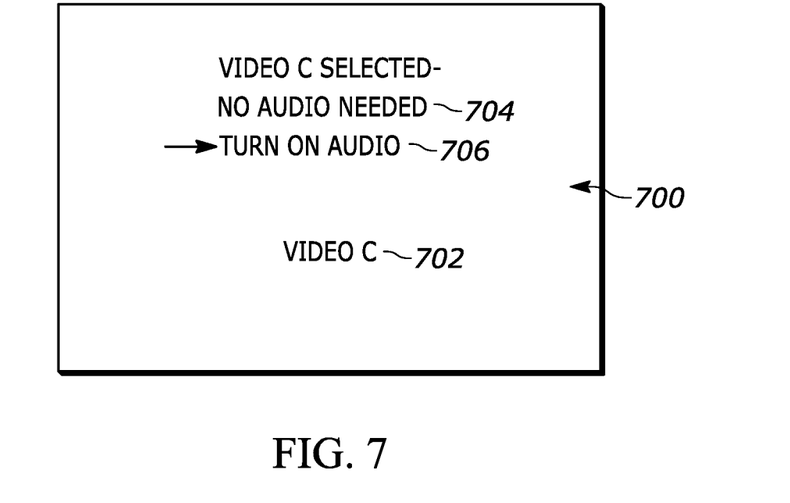

FIGS. 7 and 8 provide further illustration. In FIG. 7 a UI 700 may be presented responsive to video C having been selected from FIG. 6 to present, as indicated at 702, video C. A notice 704 may be presented indicating that video C has been selected and that the audio recommendation is "no audio", with any audio accompanying the video being automatically muted upon selection of video C. An audio on selector 706 may be presented and is selectable to audibly present the audio accompanying the video C.

Figure 8:
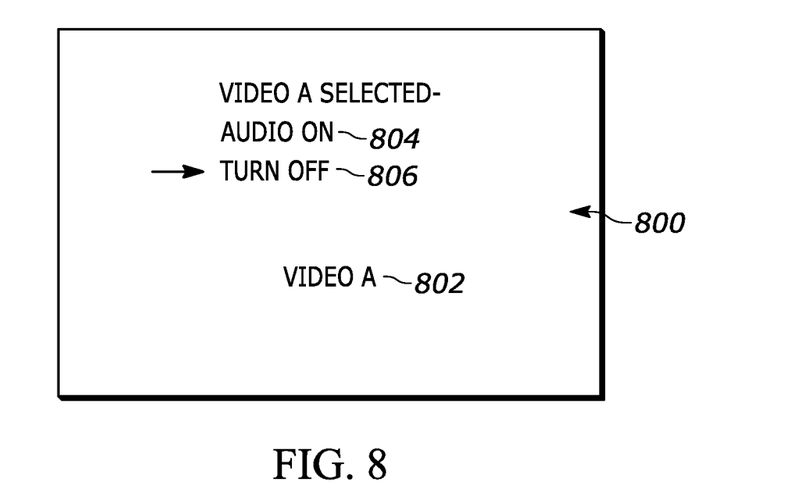

In FIG. 8 a UI 800 may be presented responsive to video A having been selected from FIG. 6 to present, as indicated at 802, video A. A notice 804 may be presented indicating that video A has been selected and that the audio recommendation is "audio on", with any audio accompanying the video being automatically audibly played upon selection of video A. An audio off selector 806 may be presented and is selectable to mute the audio accompanying the video A.

Figure 9:
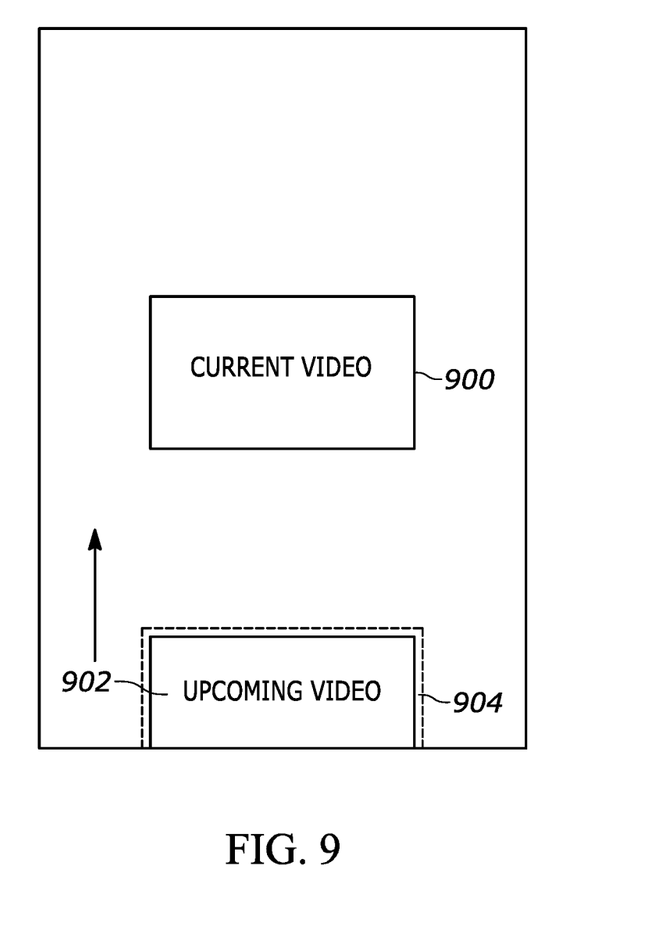

FIG. 9 illustrates a display presenting current video pane 900 playing a current video and a partial video pane 902 representing approaching media and potentially scrolling upward as indicated by the arrow 904 to replace the current video pane. The partial video pane 902 presents a still or video in only a top portion of a full video pane in the non-limiting example shown. An audio recommendation indicator 904 is presented on or near the upcoming video pane 902 indicating whether audio is or is not recommended for consumption with the video. In the example shown the indicator 904 is a halo that extends completely along all visible edges around the video pane 902, color-coded consistent with principles above to indicate the audio play recommendation.

Thus for example FIG. 9 may illustrate a newsfeed that has autoplay enabled. FIG. 9 helps the user to determine if the user should continue scrolling and denote if the user is approaching media that will have sound/require sound. The system can split newsfeed into 'sound necessary' and 'sound not necessary'. The user can toggle between these two modes. The system can order the newsfeed sorting the content with audio needed from lowest to highest or vice versa.

In some examples, a device operating consistent with present principles may even present a UI on its display to configure one or more settings of the device to operate consistent with present principles. For example, an option may be presented on a settings UI that may be selectable to enable or configure the device to undertake present principles, e.g., undertake the logic of FIGS. 3 and 5 and present the UIs of FIGS. 4 and 6-9.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;
   a video display accessible to the at least one processor; and
   storage accessible to the at least one processor and comprising instructions executable by the at least one processor to:
   present on the video display a first graphical object for a first video, the first graphical object indicating audio is important to consuming the first video; and
   present on the video display a second graphical object for a second video, the second graphical object indicating audio is not important to consuming the second video.

2. The device of claim 1, wherein the first graphical object comprises first text and wherein the second graphical objects comprises second text, the first text indicating audio is important to consuming the first video, the second text indicating audio is not important to consuming the second video.

3. The device of claim 2, wherein the first text indicates "audio required" and wherein the second text indicates "no audio needed".

4. The device of claim 1, wherein the first and second graphical objects are accompanied by respective first and second selectors that are respectively selectable to present the respective first or second video.

5. The device of claim 4, wherein the first and second graphical objects comprise respective thumbnails or video images associated with the respective first and second videos.

6. The device of claim 1, wherein the first and second graphical objects are respectively selectable to toggle audio on and off for presentation of the respective first or second video.

7. The device of claim 1, wherein the first and second videos are ephemeral videos associated with a social network.

8. The device of claim 1, wherein the first and second graphical objects are presented on the video display as part of a first user interface (UI), and wherein the instructions are executable to:
   responsive to selection of the first video from the first UI, present on the video display a second UI different from the first UI, the second UI presenting data associated with the first video;
   responsive to selection of the second video from the first UI, present on the video display a third UI different from the first and second UIs, the third UI presenting data associated with the second video.

9. The device of claim 8, wherein the second UI comprises a first notification indicating that the first video is being recommended for play with audio, and wherein the third UI comprises a second notification different from the first notification, the second notification indicating that the second video is being recommended for play without audio.

10. The device of claim 9, wherein the instructions are executable to:
    responsive to selection of the first video from the first UI, present the first video as part of the second UI and also present first audio associated with presentation of the first video; and
    responsive to selection of the second video from the first UI, present the second video as part of the third UI and also automatically mute second audio associated with presentation of the second video.

11. The device of claim 10, wherein the first UI comprises a first selector that is selectable to mute the first audio, and wherein the second UI comprises a second selector different from the first selector, the second selector being selectable to present the second audio.

12. At least one computer readable storage medium (CRSM) that is not a transitory signal, the computer readable storage medium comprising instructions executable by at least one processor to:
    identify a first audio video content as being in a first classification;
    based at least in part on identifying the first audio video content as being in the first classification, juxtapose a first graphical object with the first audio video content;
    identify a second audio video content as being in a second classification;
    based at least in part on identifying the second audio video content as being in the second classification, juxtapose a second graphical object with the second audio video content;
    wherein the first classification comprises a first audio play recommendation and the second classification comprises a second audio play recommendation.

13. The CRSM of claim 12, wherein the instructions are executable to:
    as a user scrolls through the first audio video content, second audio video content, and additional audio video content, present respective graphical objects for the respective first, second, and additional audio video contents that indicate respective audio play recommendations for the respective first, second, and additional audio video contents.

14. The CRSM of claim 12, wherein the instructions are executable to:

present, as a part of a newsfeed, the first graphical object, the first audio video content, the second graphical object, and the second audio video content; and wherein the newsfeed has autoplay enabled.

15. A method, comprising:

presenting on a video display a first graphical object indicating that a respective first video is recommended for play without audio accompanying the first video; and presenting on the video display a second graphical object indicating that a respective second video is recommended for play with audio accompanying the second video.

16. The method of claim 15, wherein the first graphical object comprises first text and wherein the second graphical objects comprises second text, the first text indicating audio is important to consuming the first video, the second text indicating audio is not important to consuming the second video.

17. The method of claim 15, wherein the first and second graphical objects are presented on the video display as part of a first user interface (UI), and wherein the method comprises:

responsive to selection of the first video from the first UI, presenting on the video display a second UI different from the first UI, the second UI presenting data associated with the first video;

responsive to selection of the second video from the first UI, presenting on the video display a third UI different from the first and second UIs, the third UI presenting data associated with the second video.

18. The method of claim 17, wherein the second UI comprises a first notification indicating that the first video is being recommended for play without audio, and wherein the third UI comprises a second notification different from the first notification, the second notification indicating that the second video is being recommended for play with audio.

19. The method of claim 18, comprising:

responsive to selection of the first video from the first UI, presenting the first video as part of the second UI and also automatically muting first audio associated with presentation of the first video; and responsive to selection of the second video from the first UI, presenting the second video as part of the third UI and also presenting second audio associated with presentation of the second video.

20. The method of claim 19, wherein the first UI comprises a first selector that is selectable to present the first audio, and wherein the second UI comprises a second selector different from the first selector, the second selector being selectable to mute the second audio.

* * * * *